United States Patent [19]
Miller

[11] Patent Number: 4,953,963
[45] Date of Patent: Sep. 4, 1990

[54] AVIATOR'S NIGHT VISION SYSTEM
[76] Inventor: Alan K. Miller, 1220 Hubbell Dr., Virginia Beach, Va. 23454
[21] Appl. No.: 394,875
[22] Filed: Aug. 17, 1989
[51] Int. Cl.⁵ .................................. G02B 23/00
[52] U.S. Cl. ............................ 350/547; 350/538
[58] Field of Search .................. 350/538, 545, 547; 250/213 R, 330; 136/291

[56] References Cited
U.S. PATENT DOCUMENTS

| | | | |
|---|---|---|---|
| 2,517,892 | 8/1950 | Larrabee et al. | 88/36 |
| 3,277,303 | 10/1966 | Jensen et al. | 250/199 |
| 3,971,933 | 7/1976 | Adamson | 250/213 VT |
| 4,449,787 | 5/1984 | Burbo et al. | 350/538 |
| 4,711,411 | 12/1987 | Copp | 244/1 R |

OTHER PUBLICATIONS
Litton Module M-927, Sep. 1987.

Primary Examiner—Bruce Y. Arnold
Assistant Examiner—Ronald M. Kachmarik
Attorney, Agent, or Firm—Griffin, Braniagan & Butler

[57] ABSTRACT

An aviator's night vision system (10) includes a small, compact, portable battery pack (68) separate from, and unattached to, a helmet (12), but comprising a container housing a battery (78) with a goggle assembly receptacle of the type that is mounted on the helmet. The goggle assembly receptacle of the portable battery pack housing includes engaging means (86 & 88), electrical contacts (90 & 92), and an orientation ridge (106) of the same type found on the helmet mounted receptacle (14). With this small portable battery pack, a goggle assembly can be removed from the helmet mounted goggle-assembly receptacle, snapped onto the portable battery pack receptacle, and thereafter used by hand for enhancing night vision.

7 Claims, 2 Drawing Sheets

AVIATOR'S NIGHT VISION SYSTEM

BACKGROUND OF THE INVENTION

This invention relates generally to the art of night vision systems, or systems for enhancing vision at night, and more particularly to auxiliary equipment for contributing to the versatility of such systems.

Night vision goggles, that is goggles that receive ambient light and multiply it up to 75,000 times, have dramatically extended aircraft operator capabilities. Pilots can now carry out search and rescue operations as well as other missions under moonlight or starlight conditions. The use of such night vision systems has become relatively common place among aviation circles, and particularly among military pilots.

Most prior art aviator night vision systems have included night vision goggle assemblies having eye pieces attached to helmets through which pilots look. Some such systems allow aviators to move the goggle assemblies between operational positions in which the eye pieces are in front of their eyes, and nonoperable positions in which the eye pieces are folded away from their eyes. Some such systems utilize goggle-assembly receptacles which are rigidly mounted to the helmets and goggle assembly plugs which are rigidly mounted to the goggle assemblies. Pilots can selectively engage the plugs in the helmet-mounted receptacles to mount the goggle assemblies on their helmets and disengage the plugs from the helmet-mounted receptacles to remove the goggle assemblies completely from their helmets. In one such system, the goggle assembly plug is also movable within the helmet-mounted goggle assembly receptacle to rotate the goggle assembly between operative and inoperative positions. In most such systems, the goggle assembly eye pieces are powered by energy received from batteries in a battery pack mounted on the helmet via electrical contacts in the helmet-mounted receptacle and the plug. When the goggle assembly is in the operative position, the receptacle contacts engage the plug contacts to provide energy to the goggle assembly eye pieces, but when the goggle assembly is rotated to the in- operative position, continuity between these contacts is broken.

A shortcoming that exists with such a prior-art night vision system is that when the plug of the goggle assembly is removed from the helmet-mounted receptacle, the goggle assembly can no longer be used because it is no longer energized by batteries in the battery pack. This disadvantage limits the usefulness of such a goggle assembly because there are many situations in which an aviator might wish to remove his helmet but yet continue to use the goggle assembly. For example, should the aviator experience a crash landing, he may wish to remove the helmet while escaping from behind enemy lines, but yet he may wish to continue to use his goggle assembly for enhancing his night vision. Therefore, it is an object of this invention to provide an improved aviator's night vision system with which a goggle assembly can be conveniently used when it is dismounted from a helmet-mounted receptacle.

It is a further object of this invention to provide such an improved night-vision system with structure that is uncomplicated and relatively easy and inexpensive to manufacture.

SUMMARY OF THE INVENTION

According to principles of this invention, an improved aviator's night vision system includes a small portable battery pack separate from a helmet-mounted goggle assembly receptacle but includes similar engaging apparatus and electrical contacts as the helmet-mounted receptacle whereby when the goggle assembly is removed from the helmet-mounted goggle assembly receptacle, the portable battery pack can be mounted on the goggle assembly and the goggle assembly can be thereby powered and still used for enhancing night vision.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
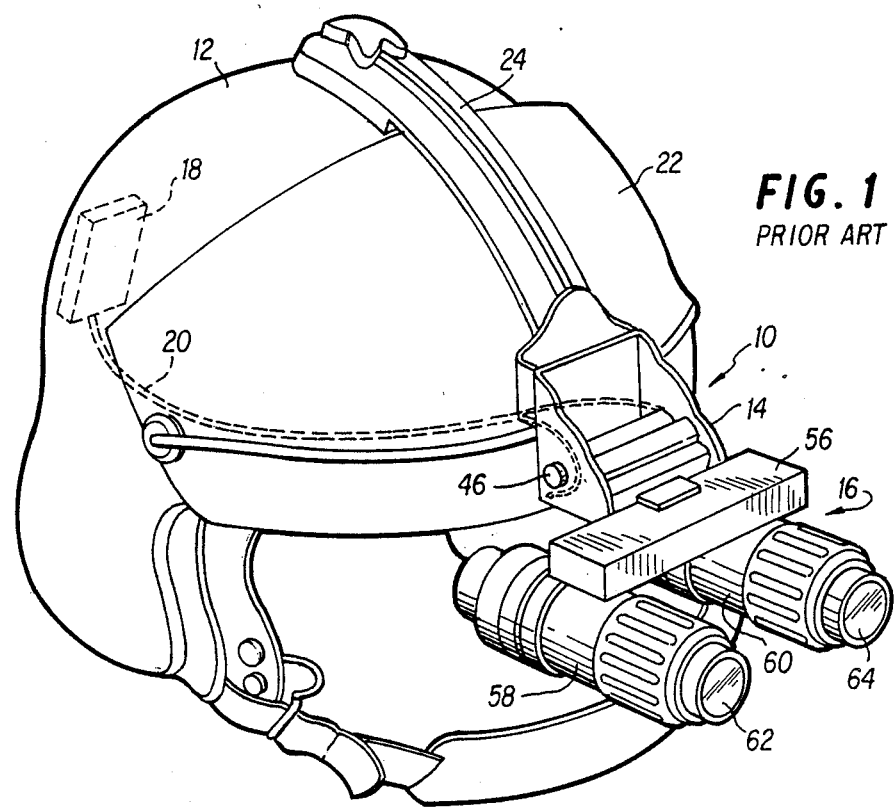
FIG. 1 is an isometric view of a prior-art aviator night vision system which is improved by apparatus of this invention.
Figure 2:
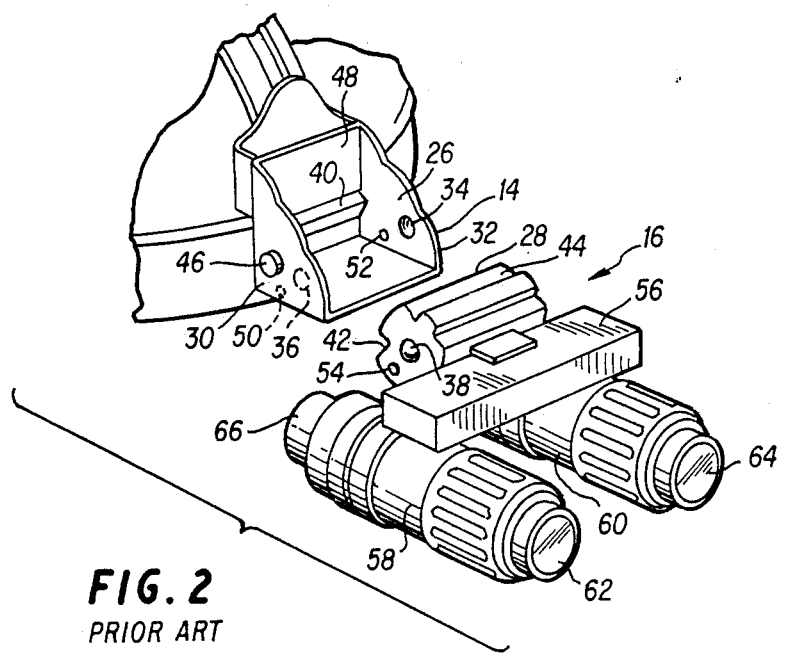
FIG. 2 is an exploded, segmented isometric view of a portion of the structure shown in FIG. 1.

In the prior art system of FIG. 1, a night vision system 10 is mounted on an aviator's helmet 12. The night visions systems 10 comprises a helmet-mounted goggle assembly receptacle 14, a removable and adjustable goggle assembly 16, a dual battery pack 18, and an electrical lead 20 from the battery pack 18 to the receptacle 14. In the depicted embodiment, the receptacle 14 is rigidly mounted on a visor shield 22 of the helmet 12, the visor shield 22 being fixed on the main portion of the helmet 12 with a visor being movable by a visor track 24 between an exposed position below the visor shield 22 and to a covered position in which it is covered by the visor shield 22. As can be seen in FIG. 2, the receptacle 14 defines a receptacle cavity 26 for removably receiving a plug 28 of the goggle assembly 16. Sidewalls 30 and 32 of the receptacle 14 define pits 34 and 36 on interior surfaces thereof for receiving spring mounted balls 38 (only one shown) on the plug 28 for selectively holding the plug 28 in the cavity 26. The receptacle 14 also includes a selectively releasable ridge 40 which mates with either a first groove 42, or a second groove 44 on the plug 28, depending on whether the goggle assembly 16 is in an operative position, or rotated to an inoperative position in the receptacle 14. When a button 46, mounted in an opening in the sidewall 30 is depressed, a cam, not shown, is moved behind the releasable ridge 40 to allow the ridge 40 to move into a slot in a rear wall 48 of the receptacle 14 so that the releasable ridge 40 disengages from the respective first or second groove 42 or 44 in which it is positioned. Electrical contacts 50 and 52 on the inside surfaces of the side wall 30 and 32 make contact with electrical contacts 54 (only one shown) on opposite sides of the plug 28 when the plug is mounted in the receptacle 14. The electrical contacts 50 and 52 of the receptacle 14 are energized by opposite sides of a battery in the battery pack 18 via the electrical leads 20.

The battery pack 18 is mounted on the rear of the aviator's helmet 12 and has two batteries therein. A switch (not shown) on the battery pack 18 allows an aviator to switch from an "off" position to a first "on" position, in which it is using one of the batteries, or a second "on" position, in which it is using the other of the batteries. In this manner, when one of the batteries is used up, the aviator can switch to the other battery.

The goggle assembly 16, in addition to comprising the plug 28, includes a support bar 56 mounted between vision enhancing eye pieces 58 and 60. The goggle assembly 16 also includes appropriate circuitry for transmitting electrical energy from the electrical contacts 54 to the eye pieces 58 and 60 for energizing electrical light amplifiers located therein, to thereby amplify light entering lenses 62 and 64 as viewed by an aviator from eye pieces 66 (only one shown).

Figure 3:
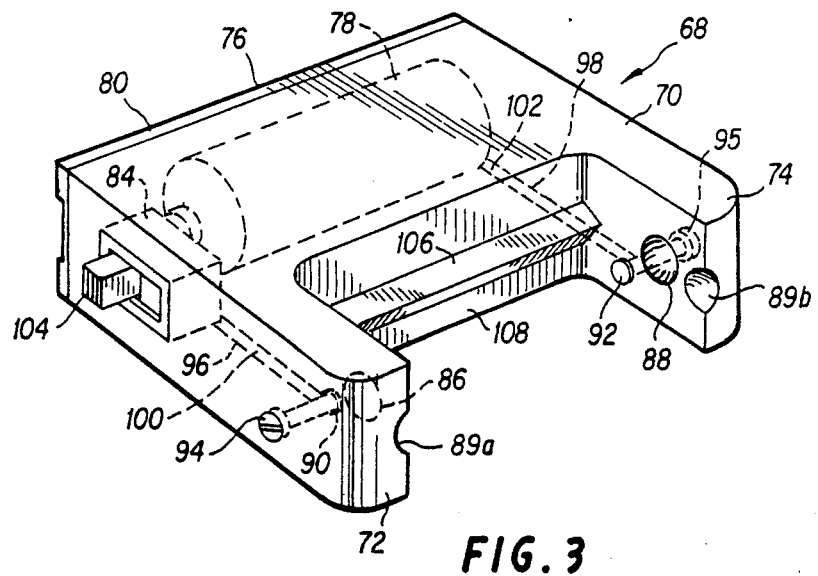
FIG. 3 is an isometric view of a portable battery pack forming a part of an improved aviator's night vision system of this invention.
Figure 4:
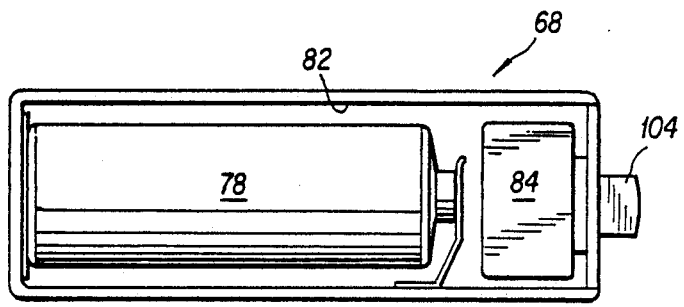
FIG. 4 is an end view of the portable battery pack of FIG. 3, but with a cover thereof removed.

A small portable battery pack 68 of this invention is depicted in FIGS. 3 and 4. The portable battery pack 68 comprises a resinous plastic housing 70 having generally a C-shape. Arms 72 and 74 of the C-shape are substantially solid, while a back 76 of the C-shape forms a hollow container for housing a battery 78. A cover 80 is removably attached to a rear of the housing 70 by screws in order to cover, and uncover, a battery/switch cavity 82, wherein the battery 78 and a switch 84 are mounted. The arms 72 and 74 of the housing 70 define pits 86 and 88 on inside surfaces thereof, facing each other. These pits 86 and 88 have approximately the same shape and relationship one to the other as do the pits 34 and 36 of the receptacle 14. The arms 72 and 74 also define, on inside surfaces thereof, indentations 89a and 89b beside their respective pits 86 and 88 to form ramps for aiding an aviator in moving the spring mounted balls 38 of the plug 28 into the pits 86 and 88. Also positioned on inside surfaces of the arms 72 and 74 are electrical contacts 90 and 92. These electrical contacts 90 and 92 have approximately the same positional relationship as do the contacts 50 and 52 of the receptacle 14. The electrical contacts 90 and 92 are actually formed by ends of threaded bolts 94 and 95 which are screwed through the outside surfaces of the arms 72 and 74 to form these contacts 90 and 92. Bores 96 and 98 extend along the arms 72 and 74 from the battery/switch cavity 82 to the bolts 92 and 94 in which electrical leads 100 and 102 extend from the battery 78 to the threaded bolts 94 and 96. In this respect, the electrical lead 100 coming from one electrical side of the battery 78 passes through contacts of the switch 84 so that this lead is opened and closed depending on the position of an actuator 104 of the switch 84.

The improved aviator's night vision system of this invention comprises a prior art night vision system 10 of FIGS. 1 and 2 and the portable battery pack 68 of FIGS. 3 and 4. In use, the plug 28 of the goggle assembly 16 is inserted into the receptacle cavity 26 of the helmet-mounted receptacle 14, with the spring mounted balls 38 on the plug 28 snapping into the pits 34 and 36 on the inner surfaces of the side walls 30 and 32 of the helmet-mounted receptacle 14. When this is done with the groove 42 of the plug 28 engaged with the releasable ridge 40, the electrical contacts 54 of the plug 28 are in contact with the electrical contacts 50 and 52 of the receptacle 14 and, if the battery pack 18 is set in an on position, energy flows from the battery pack 18 via the electrical leads 20, the contacts 50, 52 and 54, and circuitry within the goggle assembly 16 to the vision amplifying tubes 66. In this attitude, the goggle assembly 16 is in an operative position so that the aviator can look through the eye pieces 66 of the vision amplifying tubes 58 and 60 to thereby have enhanced night vision. However, if the aviator wishes to move the goggle assembly 16 to an inoperative position, he depresses the button 46 so as to release the ridge 40 from the groove 42 in the plug 28 and rotates the goggle assembly 16 upwardly. When the aviator does this, the spring mounted balls 38 of the plug 28 remain engaged with the pits 34 and 36 and the plug 28 rotates about these spring mounted balls 38; however, the electrical contacts 54 come out of contact with the electrical contacts 50 and 52. Once the aviator has rotated the goggle assembly 16 upwardly so that the groove 42 is no longer in front of the releasable ridge 40, he can release the button 46 and a spring moves the cam behind the releasable ridge 40 to cause the releasable ridge 40 to again be urged toward the plug 28. When the groove 44 of the plug 28 moves in front of the releasable ridge 40, the releasable ridge 40 snaps thereinto to hold the goggle assembly 16 in this new position. In fact, the goggle assembly 16 can be rotated without depressing button 46, however, such rotation is easier and more positively achieved by utilizing the button 46. In any event, when the goggle assembly 16 is in an inoperative position, it no longer can receive energy from the energy pack 18.

Now suppose the pilot makes a crash landing behind enemy lines and must try to escape to friendly forces. In such a situation, the aviator can discard the heavy aviator's helmet after detaching the goggle assembly 16 from the helmet-mounted receptacle 14 to take it with him. The aviator then removes his portable battery pack 68 from a pocket in which he has stored it, and snaps the pits 86 and 88 of the arms 72 and 74 on the spring mounted balls 38 of the plug 28 with the fixed ridge 106 on the back wall 108 of the C-shape of the housing 70 engaged in the groove 42 of the plug 28. In this position, the electrical contacts 90 and 92 of the portable battery pack 68 make contact with the electrical contacts 54 of the plug 28 so that if the actuator 104 of the electrical switch 84 is placed in an on, or a closed, position, the vision amplifying tubes 58 and 60 are energized by the battery 78. Thus, an aviator can move the actuator switch 104 to a closed position and then place the eye pieces 66 of the goggle assembly 16 against his eyes to see at night. When he does not wish to use the goggle assembly 16, he simply moves the actuator switch 104 to an open position so that the vision amplifying tubes 58 and 60 are no longer energized.

It should be noted that the housing 70 is only about 2 inches long, ¾ inch thick and 1 ¼ inches in depth (from ends of the arms 72 and 74 to a rear of the cover 80). Thus, the portable battery pack 68 can be easily carried by an aviator in any of his pockets. Further, it will be appreciated by those of ordinary skill in the art, that use of the portable battery pack 68 does not require any modifications to existing aviator night vision systems because the battery pack mounts on the plug 28 in the same manner that the plug mounts on the helmet-mounted receptacle 14. Further, because the portable battery pack is rigidly mounted on the plug 28, there is virtually no chance that these two members will become inadvertently detached after they have been attached and the battery pack does not adversely affect use of the goggle assembly 16. When the portable battery pack is mounted on the plug 28, it virtually becomes a part of the goggle assembly 16 and the composite assembly can be moved about as one piece by an aviator.

While the invention has been particularly shown in described with reference to a preferred embodiment, it will be understood by those skilled in the art, that various changes in form and detail may be made therein without departing from the spirit and scope of the invention.

The embodiments of the invention in which an exclusive property or privilege are claimed are defined as follows:

1. In improved aviator's night vision system of the type comprising a night vision goggle assembly and a mount for removably attaching the aviator night vision goggle assembly to an aviator's helmet, said mount including a first goggle-assembly receptacle to be fixedly attached to the helmet for removably receiving a goggle assembly plug of the goggle assembly and holding the goggle assembly on said helmet until sufficient force is applied thereto to remove said goggle assembly from said helmet, said first goggle assembly receptacle and said goggle assembly plug respectively including first and second opposite engaging means for engaging one another to allow said goggle assembly to be repeatedly mounted on and removed from said helmet, said first goggle assembly receptacle and said goggle assembly plug further including respective first and second electrical contacts which are in engagement one with the other when said opposite engagement means are engaged, said mount further including a mount power pack including an electrical battery and electrical leads for being mounted on said helmet and supplying electrical energy from said battery to said electrical contact of said first goggle-assembly receptacle to supply energy to said goggle assembly when said goggle assembly is mounted on said helmet;

the improvement wherein is further included a small portable battery pack separate from said first goggle assembly receptacle and said goggle-assembly plug being attachable to said goggle-assembly plug, said portable battery pack comprising a portable battery pack housing for containing a battery with a second goggle assembly receptacle being rigidly affixed thereto, said second goggle assembly receptacle including the same type of engaging means and electrical contacts coupled to said battery as the first engaging means for engaging the second engaging means of said plug and said first contact means for contacting said second contact means of said plug;

whereby, when said goggle assembly plug is removed from said first goggle-assembly receptacle of said mount so that said goggle assembly is not mounted on the helmet, said portable battery pack can be mounted on said goggle assembly and said goggle assembly is thereby powered and can then be used for enhancing night vision.

2. An aviator night vision systems as in claim 1 wherein said portable battery pack housing has a basic C-shape, comprising an elongated main body defining the cavity to contain said battery and rigid arms extending laterally therefrom to form said first opposite engaging means.

3. An aviator's night vision system as in claim 2 wherein said portable battery pack housing is constructed of an electrically insulative material with a cover on a rear side of the elongated main body, opposite the side from which the arms laterally extend, for covering the cavity in which the battery is contained.

4. An aviator's night vision system as in claim 3 wherein said arms are substantially solid but have bores therethrough from said cavity to said electrical contacts.

5. An aviator's night vision systems as in claim 4 wherein is included fastening devices extending through said arms parallel to said elongated body and coupled to wires extending from said battery through said passages to form said same type of electrical contacts.

6. An aviator's night vision system as in claim 5 wherein the portable battery pack further includes a switch in one of the wires extending from the battery to one of the same type of contacts.

7. An aviator's night vision system as in claim 1 wherein the portable battery pack includes a switch mounted in said housing in an electrical line extending from said battery to one of the same type of contacts.

* * * * *